United States Patent [19]

Boaron

[11] 3,879,711

[45] Apr. 22, 1975

[54] SOFTWARE ACCESSIBLE SENTINEL MEMORY AND COMPARATOR FOR CONTINUOUSLY MONITORING THE CONTENTS OF THE INSTRUCTION REGISTER OF THE CENTRAL MEMORY UNIT IN A DIGITAL DATA PROCESSING SYSTEM

[75] Inventor: Massimo Boaron, Turin, Italy

[73] Assignee: Fiat Societa per Azioni, Turin, Italy

[22] Filed: Oct. 12, 1972

[21] Appl. No.: 297,158

[30] Foreign Application Priority Data

Oct. 12, 1971 Italy .................................. 70340/71

[52] U.S. Cl. .............................................. 340/172.5

[51] Int. Cl. ........................... G06f 1/00; G11c 11/00

[58] Field of Search .................................. 340/172.5

[56] References Cited

UNITED STATES PATENTS

| | | | |
|---|---|---|---|
| 3,049,693 | 8/1962 | Shapin, Jr. | 340/149 |
| 3,296,960 | 1/1967 | Felcheck et al. | 340/172.5 UX |
| 3,540,003 | 11/1970 | Murphy | 340/172.5 |
| 3,573,855 | 4/1971 | Cragon et al. | 340/172.5 |
| 3,577,130 | 5/1971 | Rice et al. | 340/172.5 |
| 3,579,199 | 5/1971 | Anderson et al. | 340/172.5 |
| 3,587,054 | 6/1971 | Byrne et al. | 340/172.5 |
| 3,599,176 | 8/1971 | Cordero, Jr. et al. | 340/172.5 |
| 3,633,179 | 1/1972 | Reynolds | 340/172.5 |
| 3,671,940 | 6/1972 | Kronies et al. | 340/172.5 |
| 3,703,707 | 11/1972 | Bovett | 340/172.5 |
| 3,704,448 | 11/1972 | Osborne | 340/172.5 |

OTHER PUBLICATIONS

IBM Technical Disclosure Bulletin, Vol. 12, No. 1, June, 1969, page 116–117, "Data Stream Analysis Device" by Sakalay.

*Primary Examiner*—Gareth D. Shaw
*Assistant Examiner*—Paul R. Woods
*Attorney, Agent, or Firm*—Sughrue, Rothwell, Mion, Zinn & Macpeak

[57] ABSTRACT

This invention provides an improved data processing apparatus of the kind having at least one data processing unit, and a central memory unit controlled by an associated instructions register. With the object of reducing the processing time the apparatus includes a sentinel memory which receives a given programmed instruction and a comparator which compares continuously the contents of the instructions register of the central memory with the contents of a sentinel memory to provide a control signal for the control unit of the apparatus when the contents of the instructions register and the sentinel memory are identical.

2 Claims, 5 Drawing Figures

SOFTWARE ACCESSIBLE SENTINEL MEMORY AND COMPARATOR FOR CONTINUOUSLY MONITORING THE CONTENTS OF THE INSTRUCTION REGISTER OF THE CENTRAL MEMORY UNIT IN A DIGITAL DATA PROCESSING SYSTEM

The present invention relates to improvements in electronic data processing apparatus, which improvements enable reduction of the duration of the data processing or "machine times," while at the same time simplifying the programming of the apparatus.

This invention is intended for application with particular advantage to particular types of work, such as, for example, tabular research work on archives or tables, and operations entailing the input, output, or transmission of a large amount of data. In such applications, it may often happen that the data processing apparatus has to follow repeatedly the same sequence of operations on successive items stored in memory cells having progressively numbered directions, there being typically up to a thousand or more memory cells. In such cases it is necessary to insert, in the programmes employed in traditional processors, an instruction for comparison between an instruction or direction in a cell and a reference instruction at which the operational cycle should stop, or it is necessary to constantly bring up to date a counter which stores the number of cycles carried out and compares it with the programmed number of cycles. This comparison must be effected by the processor during each operational cycle. The comparison can take a very long time, expressed as a percentage of the total calculating time, which, in the usual case of processing cycles comprising very simple operations such as mere transfers of data from one part of the processor to another part, e.g., from a memory to a teleprinter, can exceed 50 percent of the machine time.

Moreover, especially when setting programs, the necessity often arises for ascertaining the status of a part of the processor, such as the condition of an area of a memory or the like, at a particular moment when the progress of the program corresponding to a critical stage of operations. In such cases it has been heretofore necessary to insert into the program being set additional instructions for display of data, which additional instruction must, however, not appear in the final program. This requirement leads to considerable complications which interfere with the rapidity of the checks to be effected on a program.

It is, therefore, an object of this invention to provide an improvement consisting in electronic data processing aparatus or other electronic machines for the treatment of data which allows of a reduction of calculation times in situations of the abovementioned type, and simplification of the programmes and their adjustment.

According to the present invention there is provided a digital electronic data processing apparatus at least one data processing unit, a central memory unit controlled by an instructions register and a control unit, characterised in that it also comprises a sentinel memory adapted to receive a given programmed instruction and an identity comparator adapted to compare continuously the contents of the instructions register of the central memory unit with the contents of the sentinel memory to provide a control signal for the control unit when the contents of the instructions register and the sentinel memory are identical.

The invention will be further described, by way of example, with reference to the accompanying drawings, wherein.

Figure 1:
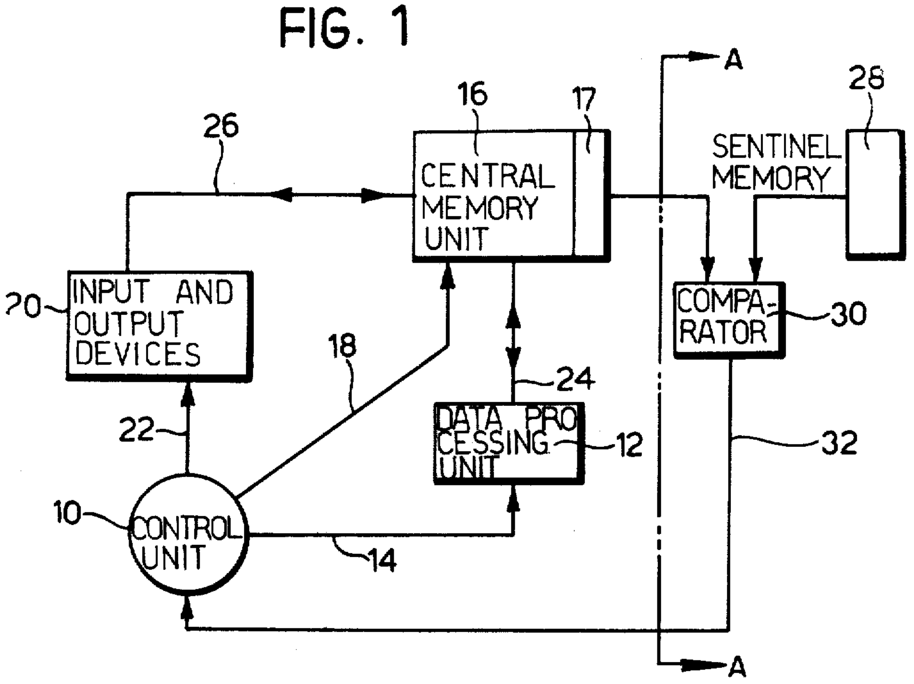
FIG. 1 is a simplified block diagram of a first embodiment of a digital electronic data processor according to this invention.

In FIG. 1, a digital electronic data processor comprises a control unit 10 which controls the operation of a data processing unit 12 through a channel 14, of a central memory unit 16 through a channel 18, and of input and output devices 20 through a channel 22. The data processing unit 12 and the input and output devices 20 are connected to the memory unit 16 through respective channels 24, 26.

The data processor according to this invention also includes the improvement illustrated to the right of the section line A—A and comprises a supplementary memory 28, termed hereinafter the "sentinel" memory constituted by one or more registers of the parallel type intended to contain respective reference instructions. An identity comparator 30, described hereinafter, compares continuously the contents of the sentinel memory 28 with the instantaneous contents of an instructions register 17 forming part of the central memory unit 16 of the processor. The identity comparator 30 emits through a channel 32 an "interrupt" signal which passes to the control unit 10 when the contents of the instructions register 17 and those of one of the registers of the sentinel memory 28 are identical.

In order better to illustrate the manner of operation of this invention, an example will now be described of a simple operation which may be required from a data processor, examining the individual steps which a conventional computer that is, without sentinel memory 28 and identity comparator 30, must effect to perform such an operation.

It will be supposed that the processor has the task of transmitting to an output device, for example to print on a teleprinter, an instruction comprising a row of 70 characters contained in the memory of the computer in the cells 1001 to 1070.

Figures 2, 3:
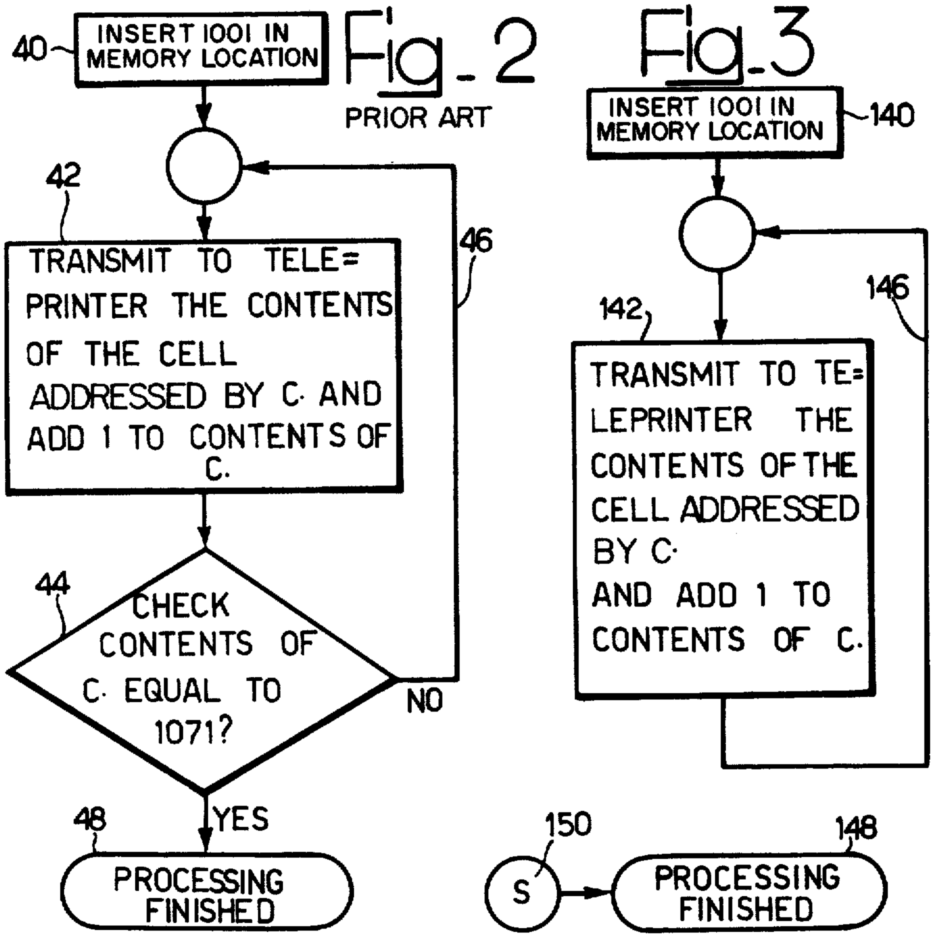
FIG. 2 represents diagrammatically a typical data processing operation effected in a conventional processor.
FIG. 3 represents an equivalent data processing operation as FIG. 2, carried out in a processor according to the present invention.

FIG. 2 shows a flow diagram corresponding to the programming of a conventional data processor for the execution of such a task. FIG. 2 represents diagrammatically respective data processing operations of a processor according to whether the cycle of operations should cease or whether it is necessary to continuously update the counter. Such a comparison may be effected by the processor in the course of each cycle of operations, and can take up a time which is very great compared with the overall calculating time which, in the usual case of processing cycles involving very simple operations, such as simple transfer of data in one part of the processor to another part, for example from a memory to a teleprinter, can exceed 50 percent of the machine time.

Moreover, particularly during adjustment of the programme, the need often arises of knowing the state of a part of the data processor, for example the state of one memory, or similar, at one particular instant in the programme, corresponding to a critical phase of operations. In those cases hitherto it was necessary to insert in the course of the programme by way of adjustment, supplementary instructions from external data, which supplementary instructions were intended subsequently to be excluded from the final programme. This entails considerable complication impeding the rapidity of the checks which can be effected in the programme. Therefore this invention proposes an improvement which consists in electronic data processing apparatus which will be apparent from a comparison of an electronic data processor of the traditional type and an electronic data processor according to this invention.

The first block 40 in FIG. 2 represents the instruction introducing the number 1001 in a memory location C. This operation is carried out by the data processing unit 12 under control of the control unit 10. the block 42 represents the transfer of the contents of the memory location having the instruction contained in C from the memory 16 to a teleprinter at the output of the processing unit, forming part of the input and output devices 20: the contents of C are then increased by 1. According to criteria well known to those skilled in the art, the programme includes at this point a comparison operation in which a check is made as to whether the contents of C have attained the value 1071 (block 44). In the case of negative response, that is, if the contents of C are less than 1071, the output 46 of the block 44 feeds the programme back to the input of block 42. In the case of affirmative response, the programme is concluded (block 48) and the processing is finished.

The processor according to this invention may on the other hand be programmed according to the flow diagram of FIG. 3, providing for the feeding into one of the registers of the sentinel memory 28 the final value of the instruction, that is the number 1071. As is evident from FIG. 3, the programme in this case starts with the initiation of the instruction (block 140), followed by the transmission to the teleprinter of the data contained in the instructions bank in C (block 142) and successive unitary increase the contents of C.

At this point the programme employed with the processor of this invention returns directly to the input of the block 142, without any previous comparison operation. Such unconditional circulation is stopped by the independent intervention (block 150) of the "interrupt" signal supplied by the comparator 30 (FIG. 1), which compares the contents of the instructions register 17 and of the sentinel memory 28.

Comparing FIGS. 2 and 3, and noting that the sentinel memory 28 operates independently of the processing unit 12 and thus does not in any way take up its operating time, the conclusion is that the use of the sentinel memory allows of considerable reduction in the machine times and thus, in the operating costs.

Naturally the sentinel memory is also suitable for other uses, as it constitutes part of the machine completely accessible to the programmer, who can use it in the most suitable way.

For instance, as already stated in the preamble, the sentinel memory may be useful in the adjustment phase of the programmes, since it can signal when the data processing unit is using data or an instruction contained in a predetermined bank. Other applications will be evident to the programmer, once he is apprised of the characteristics and possibilities of the improvement according to this invention.

Figure 4:
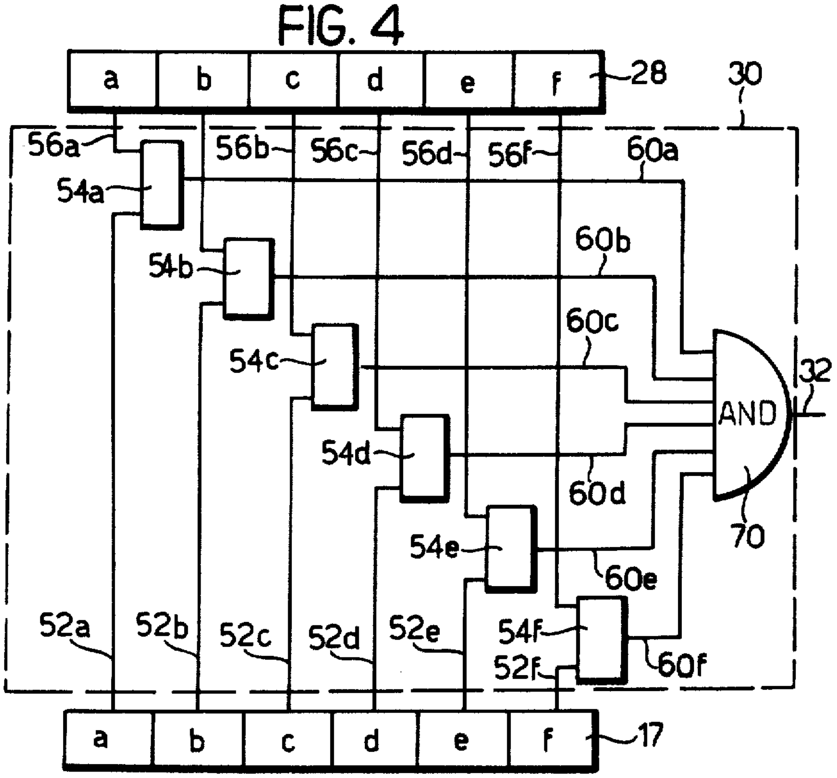
FIG. 4 is a circuit arrangement of a device forming part of the electronic processor of FIG. 1.

FIG. 4 depicts diagrammatically a preferred embodiment of the comparator of identity 30, together with register of instructions and sentinel memory units associated therewith. The instructions register 17, forming part of the central memory 16 of FIG. 1, comprises by way of example, six unitary parts 17*a*, 17*b* . . . 17*f*. Each part of the instructions register 17 is connected by a respective line 52*a*, 52*b* . . . 52*f* to respective first inputs of coincidence circuits 54*a*, 54*b* . . . 54*f*.

The second inputs of the coincidence circuits 54*a*, 54*b* . . . 54*f* are connected by respective lines 56*a*, 56*b*, . . . 56*f* to respective unitary parts 28*a*, 28*b* . . . 28*f* of a sentinel register, forming part of the sentinel memory 28 of FIG. 1.

The coincidence circuits 54*a*, 54*b* . . . 54*f* are connected by respective output lines 60*a*, 60*b*, . . . 60*f* to the inputs of an AND gate 70, which output line constitutes the "interrupt" signal line 32. The signal on the line 32 will thus assume the logic output level 1 when all the homologous parts of the instructions register 17 and of the sentinel register 28, contain identical "bits."

In the case in which it is desired to have "interrupt" signals in correspondence with many different instructions, there will be further sentinel memory registers (not shown in FIG. 4) connected to other identity comparators of the type of the comparator 30.

No intrinsic limitation exists as to the number of such registers. One side of the attached identity comparators will be piloted in each case from the same directions register 17 of the central memory. The improvement according to this invention may be applied, with even greater advantages, in a system with a common bus in which the data processing unit and the other working parts of the processor are connected in parallel to a multiline unibus. In this case it is possible also to sensitise the sentinel memory not only to the instructions but also to the data, where this is desirable for particular operations, for the purpose of simplifying programming and reducing the duration of the data processing.

Figure 5:
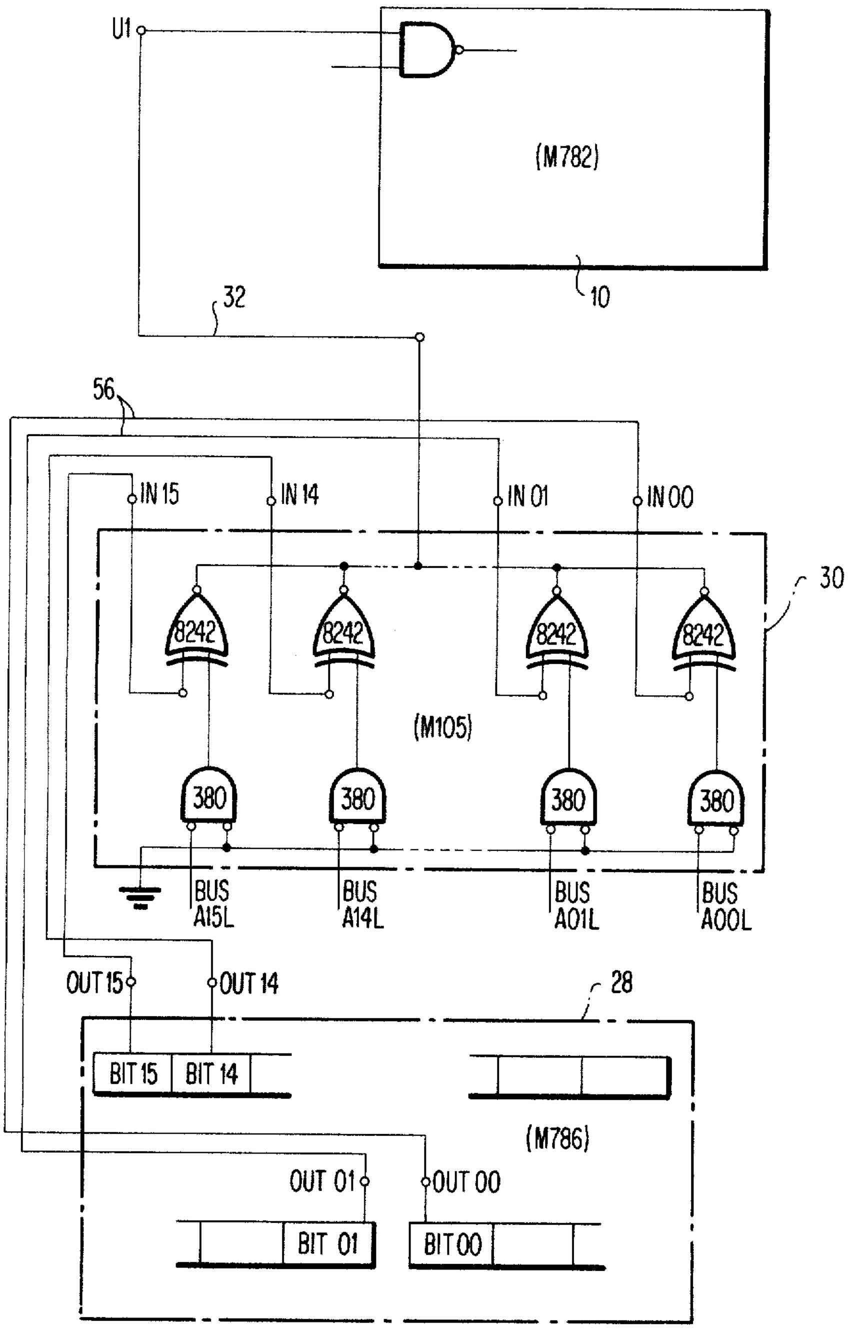
FIG. 5 is circuit diagram showing an illustrative embodiment of the invention incorporated into a known data processing system.

FIG. 5 shows an embodiment of the invention in a form which may be incorporated into the data processing system described in "PDP 11 UNIBUS INTERFACE MANUAL,", 2nd Edition, Jan. 1971, to which reader's attention is hereby directed.

The relevant parts in the Manual are the illustrations numbered 3–18 and 3–30 showing the following modules:

M 782 — Interrupt Control, and

M 786 — General Device Register.

These modules are marked in FIG. 6 by the numbers used in the Manual and also the reference numerals used in FIGS. 1 and 4. It will be seen by comparison with FIGS. 1 and 4 that the modules correspond to the control unit 10 and the "Sentinel Memory" 28, respectively.

The Manual also contains an illustration numbered 3–13 showing an Address Selector module M 105. The module comprises a series of ports marked 8242 having connected thereto a series of ports marked 380, the latter having bus inlets marked A03L, A04L, . . . A12L. This system of ports provides a sort of comparator. For the purposes of this invention, the module M 105 may be redesigned in the manner shown in FIG. 5 (in accordance with FIG. 4) to obtain a comparator 30 having 16 bus inlets AOOL, AO1L . . . A14L, A15L for the ports 380, and 16 inlets INOO, INO1, . . . IN14, IN15 for the ports 8242, thereby to match the number of outlets OUTOO, OUTO1, . . . OUT14, OUT15 available at M 786 (Sentinel Memory 28). According to the invention, the latter outlets are permanently connected through lines such as 56 (compare lines 56*a* . . . 56*f* in FIG. 4) with their corresponding inlets INOO . . . IN15 at the comparator 30; thus a cell address (say, 1071 as considered hereinbefore with reference to FIG. 2) previously set in M 786 is constantly available to the comparator 30 for comparison with signals incoming from bus inlets AOOL . . . A15L.

The interrupt control module M 782 originally comprises an inlet marked U1 in the Manual and shown in FIG. 5. According to the invention, the inlet U1 is connected to the outlet of the comparator 30 through a line 30 (compare the line 30 in FIGS. 1 and 4).

I claim:

1. Digital electronic data processing apparatus of the type comprising at least one data processing unit, a central memory unit having an instructions register which controls said central memory unit and a control unit, wherein the improvement consists in the provision of a sentinel memory adapted to receive a given programmed instruction and an identity comparator adapted to compare continuously the contents of the instructions register of the central memory unit with the contents of the sentinel memory and sending a control signal to the control unit only when the contents of the instructions register and the sentinel memory are identical.

2. Apparatus as defined in claim 1, wherein the identity comparator comprises a plurality of coincidence circuits equal in number to the number of bits which comprise an instruction, each coincidence circuit having a first input which receives the bit contained in a different part of the instructions register and a second input which receives the bits contained in an homologous part of the sentinel memory, and including an AND gate connected to the outputs of said coincidence circuits, the output signal of said AND gate constituting an "interrupt" signal.

* * * * *